US011397913B2

(12) United States Patent
Colella et al.

(10) Patent No.: US 11,397,913 B2
(45) Date of Patent: Jul. 26, 2022

(54) SYSTEMS AND METHODS FOR AUTOMATED MULTIMODAL DELIVERY

(71) Applicant: Ford Global Technologies, LLC, Dearborn, MI (US)

(72) Inventors: Nicholas Colella, Grosse Ile, MI (US); Andrea Chowanic, West Bloomfield, MI (US); David Michael Herman, Oak Park, MI (US); Ashwin Arunmozhi, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 378 days.

(21) Appl. No.: 16/416,055

(22) Filed: May 17, 2019

(65) Prior Publication Data
US 2020/0364663 A1    Nov. 19, 2020

(51) Int. Cl.
*G06Q 10/08* (2012.01)
*G05D 1/00* (2006.01)
*G01C 21/34* (2006.01)

(52) U.S. Cl.
CPC ... *G06Q 10/08355* (2013.01); *G01C 21/3423* (2013.01); *G05D 1/0088* (2013.01); *G05D 2201/02* (2013.01)

(58) Field of Classification Search
CPC .......... G06Q 10/08355; G01C 21/3423; G01C 21/20; G05D 2201/02; G05D 1/0088; B64C 39/024; B64C 2201/08; B64C 2201/12; B64C 2201/128; B64C 2201/141; B64C 2201/20; B64C 2201/208
USPC ........................................................ 705/338
See application file for complete search history.

(56) References Cited

U.S. PATENT DOCUMENTS

| | | | |
|---|---|---|---|
| 9,070,101 B2 | 6/2015 | Abhayanker et al. | |
| 9,373,149 B2 | 6/2016 | Abhayanker et al. | |
| 9,494,937 B2 | 11/2016 | Siegel et al. | |
| 10,068,486 B1 | 9/2018 | Bar-Zeev et al. | |
| 10,909,648 B2* | 2/2021 | Ibe | G06Q 50/28 |
| 2015/0142250 A1* | 5/2015 | Cavender-Bares | A01B 69/008 701/23 |
| 2016/0016663 A1* | 1/2016 | Stanek | G05D 1/0094 701/3 |

(Continued)

FOREIGN PATENT DOCUMENTS

| | | |
|---|---|---|
| EP | 3115948 A1 | 1/2017 |
| WO | 2017/213621 A1 | 12/2017 |

OTHER PUBLICATIONS

Shaban, H. (Mar. 22, 2018) Amazon is issued patent for delivery drones that can react to screaming voices, flailing arms (2 pages). Retrieved from https://www.washingtonpost.com/news/the-switch/wp/2018/03/22/amazon-issued-patent-for-delivery-drones-that-can-react-to-screaming-flailing-arms/?noredirect=on&utm_term=.e94db37cbdbb.

*Primary Examiner* — Igor N Borissov
(74) *Attorney, Agent, or Firm* — Brandon Hicks; Eversheds Sutherland (US) LLP

(57) ABSTRACT

Systems, methods, and computer-readable media are disclosed for automated multimodal delivery. Example methods may include determining information associated with the delivery; determining, based on at least a first portion of the information, that a first confidence level indicative of a delivery capability using a first vehicle is above a first threshold; and determining, based on at least a second portion of the information, a second confidence level indicative of a delivery preference for delivery using the first vehicle relative to a second vehicle.

16 Claims, 6 Drawing Sheets

(56) References Cited

U.S. PATENT DOCUMENTS

| | | | |
|---|---|---|---|
| 2016/0364989 A1* | 12/2016 | Speasl | G08G 5/0082 |
| 2017/0011343 A1 | 1/2017 | Stenneth et al. | |
| 2017/0160735 A1* | 6/2017 | Mikan | G08G 5/0034 |
| 2018/0107211 A1* | 4/2018 | Schubert | G08G 5/0013 |
| 2018/0137454 A1* | 5/2018 | Kulkarni | G08G 5/0021 |
| 2018/0158018 A1* | 6/2018 | Luckay | B64C 39/024 |
| 2019/0191311 A1* | 6/2019 | O'Brien | G05D 1/0055 |
| 2019/0220044 A1* | 7/2019 | Ruth | G05D 1/0206 |
| 2019/0233105 A1* | 8/2019 | O'Brien | B64F 1/32 |
| 2021/0080960 A1* | 3/2021 | Ganesh | G05D 1/0214 |

* cited by examiner

SYSTEMS AND METHODS FOR AUTOMATED MULTIMODAL DELIVERY

TECHNICAL FIELD

The present disclosure relates to systems, methods, and computer-readable media for automated delivery, and in particular, to providing automated multimodal delivery.

BACKGROUND

Autonomous vehicles (AVs) can be used as delivery vehicles. However, AVs may not have a driver to hand deliver items to a door step once the AV reaches a delivery location. Accordingly, a user may need to manually retrieve the item from the AV. In some cases, the roads for an AV to traverse to gain proximity to a given location may be in poor condition or may be incomplete. This may result in the AVs having a limited set of available roads to use or may result in the AV facing road-usage restrictions. In some cases, users may prefer that an item may be left on a particular area of the user's residence which may be inaccessible to the AV, such as a balcony, a fenced backyard, or a front door. In other cases, a user may prefer to personally pick up the package from the AV, for example, when the user's residence lacks access to a secure location for item drop off.

DETAILED DESCRIPTION

Figure 1:
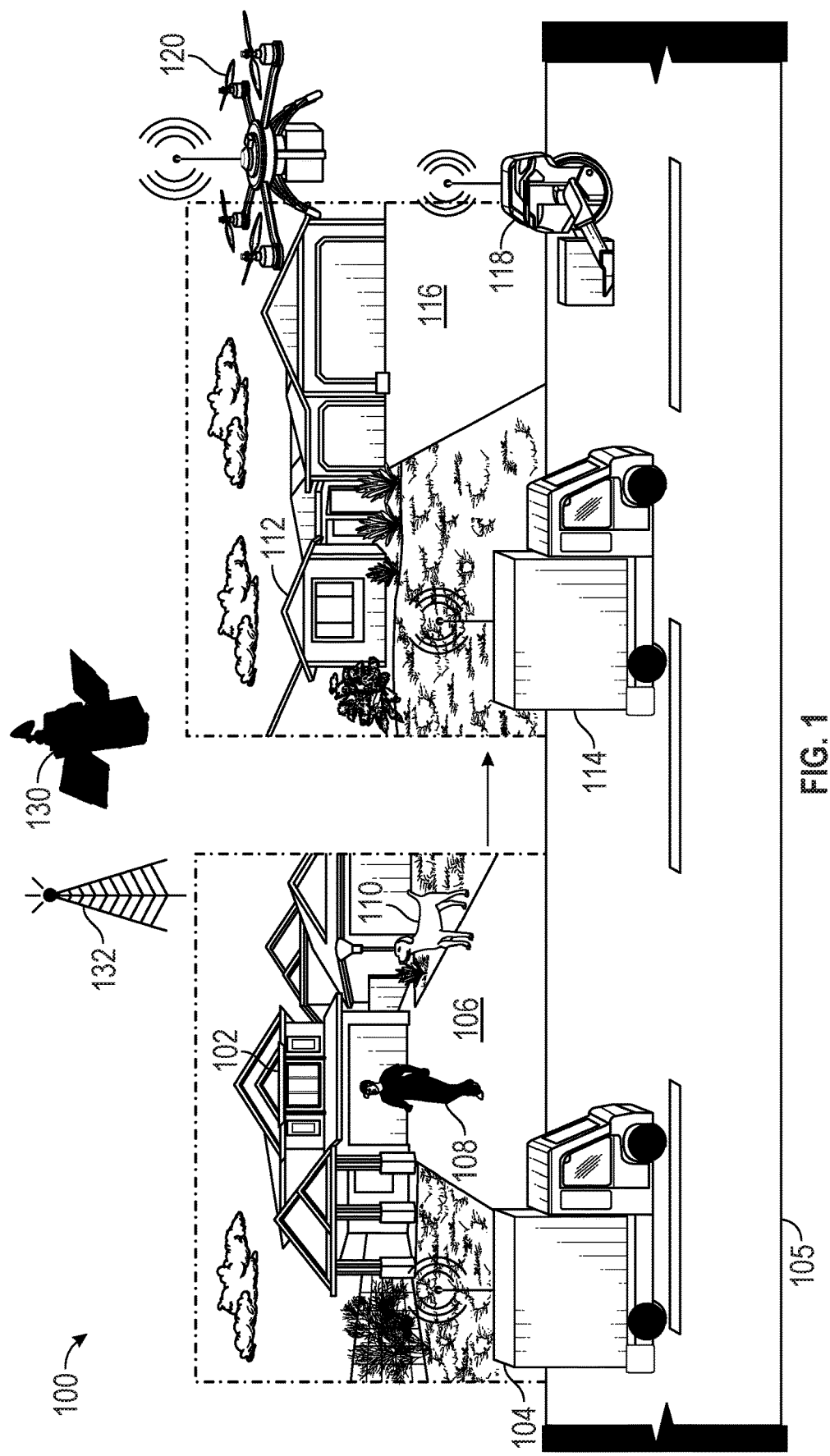
FIG. 1 shows a diagram of an environmental context for automated multimodal delivery of items, in accordance with example embodiments of the disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Overview

As noted, an AV may face various obstacles in delivering items to a user's residence. This may result in a user having to personally pick up the package from the AV. Accordingly, the AV may recruit a delivery vehicle (for example, an unmanned aerial vehicle (UAV) or a delivery robot) to deliver items. Moreover, users may find item delivery using a delivery vehicle to be convenient. For example, in cold weather conditions, UAV delivery may save a user effort and time, which may contribute to user satisfaction. However, in some cases, it may be difficult to perform a delivery by a delivery vehicle. For example, numerous factors, such as the presence of high winds, animals in a user's residence (which may attack the delivery vehicle), or high tree/foliage cover in the back yard, and the like may reduce the likelihood of successful delivery by the delivery vehicle.

Embodiments of the disclosure are generally directed to AVs that can use delivery vehicles (for example, unmanned aerial vehicle (UAVs) and delivery robots) to deliver items to users at user locations (for example, a user residence or place of business). For example, an AV may hail UAVs or may use on-board, deployable UAVs to deliver items. In other examples, the AV may use hail a delivery robot or may use an on-board, deployable delivery robot to deliver items. In some examples, the delivery vehicle may drop off an item on a designated area (for example, a porch, balcony, or the like) at the user's residence. As another example, the delivery vehicle may drop off the item using latitude and longitude coordinates, language-based description of the designated areas, and/or the like.

In some examples, the disclosed systems may use an algorithm to evaluate the possibility of making a delivery to a location prior to attempting the delivery. In particular, the disclosed systems may query an external device (for example, a device on the Internet or on the cloud, an on-board database, and/or a vehicle or UAV-based sensor) to determine information about the delivery location. The information may be processed to determine an ease of delivery of the item to the location by the delivery vehicle. Nonlimiting examples of such information that can be used to determine the feasibility of a delivery may include road conditions proximate to the location, weather reports, previous delivery history associated with the location, crime data at the location, camera footage, aerial photography footage, and/or the like.

In addition to determining a possibility making the delivery using the delivery vehicle, the disclosed systems may determine the preferability of making the delivery. In particular, the disclosed systems can determine, based on the information that a first confidence level indicative of a delivery capability (for example, possibility of delivery with AV or delivery vehicle) is above a first threshold. The disclosed systems can further determine, based on the information, a second confidence level for a delivery preference (for example, preferability of delivery) using the AV relative to the delivery vehicle (for example, a UAV or delivery robot). If both the first and second confidence levels are greater than respective thresholds, the disclosed systems can transmit an instruction to the delivery vehicle to perform the delivery to the location. In some cases, if the delivery vehicle is unable to perform the delivery to the location, the AV may reschedule the delivery. Alternatively, the AV may transmit a request a manual pickup of the item from the AV by an individual residing at the location.

In some examples, to determine a delivery capability that reflects the possibility of making a delivery, the disclosed systems may perform numerous analyses based on obtained data, detailed below. The analyses may be used to determine the first confidence level. The analyses may include determining a historical success rate of deliveries (for example, using logistic regression) to the location or a user complaint rate, or may include determining that a delivery route is blocked. Further, the disclosed systems may process the obtained data using a decision tree, which can include a decision support tool that uses a tree-like model of decisions and their possible consequences, including chance event outcomes, resource costs, and utility. The decision tree can be programmed to allow the disclosed systems to determine the delivery capability efficiently.

In some embodiments, to determine the preferability of delivering an item using a delivery vehicle, the disclosed systems may perform numerous analyses on data to determine various features associated with the location, as detailed below. In some examples, the disclosed systems may analyze sensor data associated with the AV and/or a scouting UAV to determine the presence of a homeowner at the residence (for instance, by determining the presence of vehicles in drive way. Further, the disclosed systems may process the data using an additional decision tree. Moreover, the decision trees associated with the possibility and preferability of item delivery using a delivery vehicle may be used to plan the actions of the AV and associated delivery vehicle to improve delivery success rates and user satisfaction rates. In some cases, if the determination of the possibility and preferability of item delivery using a delivery vehicle indicate that the delivery vehicle is unable to make the delivery, then the decisions trees may be configured to indicate that the AV can instead schedule a manual pickup of the item by an individual at the location.

In some embodiments, the disclosed systems may determine that the delivery is not possible or preferable using a delivery vehicle. Accordingly, the disclosed systems may reschedule the delivery with the user. In some examples, the disclosed systems may also provide a report including information about why the delivery using a delivery vehicle was not implemented. The disclosed systems may perform the rescheduling and/or may transmit the report via a delivery application on a user device (for example, a mobile phone), as shown and described in connection with FIG. 4, below.

Embodiments of the disclosure may have various advantages over conventional delivery services. For example, embodiments described herein may lead to an increase in the number of successful deliveries of items to users. Further, by using data analytics and machine learning, the disclosed systems may better schedule the delivery of items to users thereby increasing the efficiency of the delivery process. In some cases, the disclosed embodiments may facilitate the delivery of items to users without the need for human pickup. This may reduce the loss of UAVs and/or items and may improve user satisfaction.

Further, as noted, the devices and systems (and their various components) described herein can employ artificial intelligence (AI) to facilitate the multimodal delivery and other features described herein. The components can employ various AI-based schemes for carrying out various embodiments and/or examples disclosed herein. To provide for or aid in the numerous determinations (for example, determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data. For example, the AI can be used to determine the possibility and/or preferability of making a delivery of an item to a particular location.

Such determinations can result in the construction of new events or actions from a set of observed events and/or stored event data, whether the events are correlated in close temporal proximity, and whether the events and data come from one or several event and data sources (for example, different sensor inputs). Components disclosed herein can employ various classification (explicitly trained (for example, via training data) as well as implicitly trained (for example, via observing behavior, preferences, historical information, receiving extrinsic information, etc.)) schemes and/or systems (for example, support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determinations. In some examples, the training may involve using data associated with previously successful and unsuccessful deliveries of an item to a location to train the AI-based techniques in order to improve the likelihood of successful item delivery by the delivery vehicles and/or the AVs, A classifier can map an input attribute vector, $z=(z1, z2, z3, z4, \ldots, zn)$, to a confidence that the input belongs to a class, as by $f(z)=\text{confidence(class)}$. Such classification can employ a probabilistic and/or statistical-based analysis (for example, factoring into the analysis utilities and costs) to determinate an action to be automatically performed. In some examples, the disclosed systems may use a classifier to classify an item delivery by a delivery vehicle as being possible or not-easily possible, and/or to classify the item delivery by the delivery vehicle as being preferable or not preferable. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Example Embodiments

FIG. 1 shows a diagram of an environmental context for automated multimodal delivery of items, in accordance with example embodiments of the disclosure. Environmental context 100 includes some example scenarios in which the disclosed systems may perform automated deliveries. It is to be understood that the example scenarios included in environmental context 100 are not limiting as to the scope of the disclosure's possible applications.

Environmental context 100 includes a first residence 102 including a first driveway 106, a AV 104, a user 108 standing in the first driveway 106, and a dog 110. In particular, the AV 104 may drive on street 105 and may carry various items including items to be delivered to the first residence 102. One or more devices of the AV 104 may determine that the user 108 is standing in the first driveway 106. For example, a camera of the AV 104 may be configured to capture image data, such as a video, of the first residence 102. The disclosed systems analyze the video data using any suitable AI-based technique to detect the presence of the user 108 and/or the dog 110. In particular, the disclosed systems may determine that while it may be possible to deliver the item using a delivery vehicle, the presence of the user 108 and proximity to the AV 104 may make it unreasonable to deliver the item using a delivery vehicle. For example, the AV 104 may determine that it would lose additional time in deploying a delivery vehicle to deliver the item when the user 108 may quickly pick up the item from the AV 104. Further, the presence of the dog 110 in proximity to the AV 104 may make it more difficult for the delivery vehicle to successfully deliver the item. For example, the disclosed systems may determine that the dog is likely to engage with the delivery vehicle and disturb the delivery vehicles path to delivering the item. For both these reasons, the AV 104 may determine to allow the user 108 to pick up the item from the AV 104.

Environmental context 100 further includes a second residence 112 including a second driveway 116, and a vehicle 114 which may correspond to the same AV 104 at the second residence 112 instead of the first residence 102. Environmental context 100 also includes a delivery robot 118 and a UAV 120. In particular, one or more devices of the AV 104 may determine that the second residence 112 is suitable for an automated delivery of the item. For example, the camera of the AV 104 may be configured to capture image data, such as a video, of the second residence 112. The disclosed systems may analyze the video data using an AI-based technique to determine that the second driveway 116 is clear (for example, that the second driveway 116 does not contain any delivery vehicles or obstacles). In particular, the disclosed systems may determine that it is possible to deliver the item to the second residence 112 using a delivery vehicle, at least because there are no obstructions to the path that the delivery vehicle would take in making the delivery. Further, the disclosed systems may determine that it is preferable to deliver the item to the second residence 112 using the delivery vehicle, at least because there is no immediate indication of any difficulties associated with making such a delivery using the delivery vehicle. For example, in contrast to the delivery to the first residence 102, the disclosed systems may determine that there is no dog or other obstruction that would complicate or compromise the delivery of the item to the second residence 112. Having determined that it is both possible and preferable to make a delivery of the item to the second residence 112 using a delivery vehicle, the disclosed systems may dispatch the delivery robot 118 to deliver the item to the second residence 112. For instance, the delivery robot 118 may take the item and drop it off at the front door or the back door of the second residence 112. In another example, the disclosed systems may analyze the video using the AI-based technique to determine that the second driveway 116 is blocked (for example, the disclosed systems may determine that there are obstacles (not shown) on the second driveway 116). In this example, the disclosed systems may determine that the possibility of making a successful delivery using a ground-based delivery vehicle is unlikely. However, the disclosed systems may perform a similar analysis for determining the possibility of making a successful delivery using a UAV, and may conclude that the possibility of success is high. The disclosed systems may then determine that the preferability of making the delivery using the UAV is also above a predetermined threshold. For example, the disclosed systems may determine that there are no immediate obstructions to the flight path of the UAV 120 from the AV 114 to the residence 112. Accordingly, the disclosed systems may dispatch the UAV 120 to take the item through the air thereby bypassing the second driveway 116 and dropping off the item at the front door or the back door of the second residence 112.

In other examples, the disclosed systems may identify and analyze various features of the environment and/or the second residence 112 to make a determination of whether to deliver the item using the UAV 120, a delivery robot 118, or to request that a user 108 pickup the item from the AV 104. As noted, the disclosed systems may analyze features such as the presence of a user, a pet such as a dog, obstacles such as cars in the driveway of a residence and/or the like to determine the possibility of making the delivery of the item to a location. Upon determining that the possibility of making such a delivery is beyond a given threshold, the disclosed systems may further analyze data such as user preferences, weather reports, crime reports, and/or the like (as further detailed below), to determine a preferability of making an item delivery to the location using a delivery vehicle. In particular, to determine the delivery capability reflecting the possibility of delivering the item using a delivery vehicle (such as a UAV or a robotic vehicle), the disclosed systems may perform numerous analyses. For example, the disclosed systems can analyze satellite imagery from a satellite 130 to determine a residence layout (for example, associated with the first residence 102 or second residence 112). Accordingly, the AV 104 may identify that the residence layout includes a residence type (for example, a single-family home), may determine a backyard size, may identify the presence of trees, and/or the like.

The disclosed systems may use any suitable AI-based technique to make the determinations. Non-limiting examples of such techniques may include computer vision-based techniques and/or machine learning based techniques. The machine learning-based technique may include a convolutional neural network (CNN). For example, the CNN may analyze images associated with the residence to classify various portions of the image. The classifications may correspond with features of the residence such as a backyard, a front yard, a driveway, and/or the like. For example, the disclosed systems may analyze the residence layout by querying various databases to determine the availability of delivery sites and determine associated aerial delivery paths for UAV delivery along with corresponding tolerances. If the aerial paths are suitable for UAV delivery and the corresponding tolerances are within predetermined threshold, the disclosed systems may determine that the item may be delivered using a UAV 120.

In some examples, the disclosed systems may analyze both historical and current weather data, to determine if the AV 104 and/or a delivery vehicle (for example, UAV 120 or delivery robot 118) is able to deliver the item. For instance, the disclosed systems may determine a wind speed or a precipitation rate at the residence. In particular, the disclosed systems may determine that a wind speed is below a speed threshold, or the precipitation rate is below some threshold in order for the disclosed systems to authorize the delivery of the item by the delivery vehicle.

In some examples, the disclosed systems may analyze sensor data associated with the AV 104 and/or sensor data associated with a scouting vehicle (such as a scouting UAV similar or identical to UAV 120) to determine the possibility of item delivery to the residence using a delivery vehicle. For instance, the disclosed systems may analyze the sensor data to determine the presence of vehicles in a driveway (such as first driveway 106) of a residence (such as first residence 102). In particular, the presence of vehicles in the driveway may make it more difficult for a delivery robot to perform a delivery using the driveway. The disclosed systems may further analyze the sensor data to determine the accessibility of a residence to the AV 104. For example, the disclosed systems may determine the presence of a fenced backyard, which may make deliveries to the backyard using a delivery robot more difficult.

In some examples, the disclosed systems may correlate sensor data and data based on satellite imagery as obtained by a satellite 130. In some cases, the disclosed systems may determine that the satellite imagery is dated. Accordingly, the disclosed systems may use the sensors to determine current conditions of the residence. For example, the disclosed systems may determine the current tree cover, the presence or lack of a fence, openings in the fence (for example, holes and open doors). In some cases, the disclosed systems may transmit information associated with current conditions of the residence to a network via cell towers 132 (or similar network connection) to update dated satellite imagery data.

The disclosed systems may use the sensor data to detect the presence of animals such as dog 110 which may prevent delivery. For example, the disclosed systems may use microphones (for example, microphones associated with the AV 104 or a delivery vehicle) to detect animal noises (dog barks, growling, etc.) associated with the presence of animals. In some examples, the disclosed systems may use the microphones to perform acoustic triangulation to determine the location of such animals. Acoustic triangulation can refer to the use of sound to determine the distance and direction of its source (e.g., an animal). For acoustic triangulation, the disclosed systems may measure the source direction at two or more locations in space, to triangulate its location.

The disclosed systems may use the AV's 104 cameras or a scouting UAV's cameras to identify signage associated with a residence or neighborhood. For example, the disclosed systems can use optical character recognition (OCR) to interpret the signs. The signs may inform users about animals on the property or may inform users about certain access restrictions, traffic events, and/or the like.

The disclosed systems may determine the possibility of delivering the item using a delivery vehicle using various item characteristics. In particular, the disclosed systems may determine an item size and weight and/or special item characteristics (for example, unbalanced, fragile, etc.) to determine the possibility of delivery. For example, if the disclosed systems determined that the item is too heavy for a given delivery vehicle, the disclosed systems may determine not to deliver the item using the delivery vehicle. The disclosed systems may determine the past success rates of a UAV-based delivery under similar environmental conditions and/or may identify rate of user complaints from a database to determine the possibility of delivering the item using a delivery vehicle.

In some embodiments, the disclosed systems may use a scouting vehicle's sensor data to determine information associated with a given location. Alternatively, upon a given delivery attempt by a UAV (such as UAV 120) or a delivery robot (such as delivery robot 118) to a proximate location, the disclosed systems may analyze the delivery vehicle's sensor data (for example, image sensors, temperature sensors, humidity sensors, barometric sensors, and/or the like) to determine information associated with a given location. Nonlimiting examples of such information may include the presence of snow, mud, animals, water puddles, and other hazards that would reduce the rate of successful item delivery or negatively user satisfaction. In some cases, a UAV's sensor data may also include the tree coverage along the intended aerial delivery path. The disclosed systems may then use the sensor-based data along with a decision tree to generate a score reflecting the possibility of making a successful delivery to the location. For example, the disclosed systems may assign a weight to the presence of various hazards as detected by the sensors. For instance, the presence of a water puddle may be given a greater weight than the presence of an obstacle such as a trashcan in the driveway of a residence for a determination of the possibility of making the successful delivery using a ground-based robotic delivery vehicle. The disclosed systems may then sum up a total score from individual scores associated with the sensor-based analyses. If the disclosed systems determined that the total score is greater than a predetermined threshold, then the disclosed systems may proceed to making a preferability analysis reflecting the preferability of making the delivery of the item to the location using the delivery vehicle.

As noted above, upon determining that the possibility of making the delivery of the item to the location, the disclosed systems may perform further analysis to determine the preferability of delivering the item to the location. In some examples, to determine the preferability of delivering an item using a delivery vehicle, the disclosed systems may perform numerous analyses to data reflecting features associated with the location. For example, the disclosed systems may determine the time of day, and may determine to avoid delivering items at predetermined times (for example, in the evenings in order to avoid interrupting a family's dinner time).

In further examples, the disclosed systems may determine crime data statistics associated with a given location. In particular, if the disclosed systems determine that the crime data statistics reflect a high crime rate, the disclosed systems may determine that there is a high risk of item theft. Accordingly, the disclosed systems may avoid delivering those items using the delivery vehicle.

The disclosed systems may determine weather data from one or more databases (for example, Internet-based databases). Moreover, the disclosed systems may determine weather data from AV 104 sensors and/or UAV 120 sensors. The sensor data may provide information related to snow coverage, wind speed, temperature, and the like at the residence.

The disclosed systems may determine the available path for the AV 104 or delivery vehicle to drop off the items at the location. Moreover, the disclosed systems may determine a corresponding distance along the path. In some examples, the disclosed systems may determine a weather condition along the path. For instance, the disclosed systems may determine a snow coverage along the path using the above-described techniques.

In some examples, the disclosed systems may identify a user profile for users using the AV 104 or delivery vehicle. In particular, the user profile may include an age of the user, the user's past-preference history, the user's requested delivery-location history, and/or the like. The disclosed systems may determine the preferability of item delivery to a given user at a particular location based on information derived from the user profile.

The disclosed systems may determine an item characteristic, such as weight, size, perishability, fragility, cost, and/or postage type (for example first-class, priority, overnight, and/or the like). For example, the disclosed systems may determine an item weight. The disclosed systems may determine to deliver a heavier item closer to the residence as opposed to a lighter item.

The disclosed systems may use UAV sensor data from a previous delivery attempt to determine a present status of a location. For example, the disclosed systems may detect snow, mud, animals, water puddles, and other hazards or negative features that would reduce successful item delivery and/or negatively affect user satisfaction. The UAV's sensor data may also include the tree coverage along an intended aerial delivery path by a UAV.

The disclosed systems may use the collected data to determine a decision tree to determine whether to activate a delivery vehicle (such as a ground-based robot or a UAV) or to use the AV 104 for delivery. In particular, in some examples, the disclosed systems may use the results of the preferability analysis to determine whether to request for a user to pick up the item from the AV 104 or to use a delivery vehicle to deliver the item to a desired location (e.g., a backyard of the residence or a front door of a place of business) of a user. As noted, the disclosed systems may use decision trees that can indicate the course of action for a given analysis of the data from various devices including sensors of the AV and/or delivery vehicles, third-party databases, the Internet, and/or the like. In some examples, the decision tree may be determined manually or may be determined using machine-learning algorithms that are trained via past user satisfaction surveys, previous success rates, manually programed procedures and/or protocols, and/or the like. The user satisfaction surveys may be transmitted to the users at a user device upon the completion of a delivery. Accordingly, the users may fill in a questionnaire, answer multiple-choice questions, provide a ranking score, and/or the like using an application running on the user device.

In some examples, the AV 104 may be any suitable vehicle such as a car, truck, recreational vehicle (RV), boat, plane, etc., and may be equipped with suitable hardware and software that enables it to communicate over a network, such as a local area network (LAN).

In another embodiment, the AV 104 may include a variety of sensors that may aid the vehicle in navigation, such as radio detection and ranging (RADAR), light detection and ranging (LIDAR), cameras, magnetometers, ultrasound, barometers, and the like. In one embodiment, the sensors and other devices of the AV 104 may communicate over a network connection. In other embodiments, the AV 104 and/or a delivery vehicle may communicate with the user at a user device using the network connection. Examples of suitable network connections include a controller area network (CAN), a media-oriented system transfer (MOST), a local interconnection network (LIN), a cellular network, a Wi-Fi network, and other appropriate connections such as those that conform with known standards and specifications (for example, one or more Institute of Electrical and Electronics Engineers (IEEE) standards, and the like).

In one embodiment, the AV 104 may include one or more magnetic positioning devices such as magnetometers, which may offer a location determination accuracy of about 1 to 2 meters with 90% confidence level, without using additional wireless infrastructure for positioning. In one embodiment, the magnetic positioning devices may be used to determine the elevation of the AV 104 or a delivery vehicle such as a UAV. Alternatively or additionally, a barometer device may be used to determine the elevation of the AV 104 or the delivery vehicle. In another embodiment, barometers and pressure altimeters may be a part of the vehicle and may measure pressure changes caused by a change in altitude of the AV 104.

In one embodiment, the AV 104 may use one or more inertial measurement devices (not shown) to determine the vehicle's position. The AV 104 may use dead reckoning and other approaches for positioning of the vehicle using an inertial measurement unit carried by the AV 104, sometimes referring to maps or other additional sensors to constrain the inherent sensor drift encountered with inertial navigation. In one embodiment, one or more microelectromechanical systems (MEMS) based inertial sensors may be used in the inertial measurement unit of the AV 104; however, the MEMS sensors may be affected by internal noises which may result in cubically growing position error with time. In one embodiment, to reduce the error growth in such devices, a Kalman filtering based approach may be used, by implementing software algorithms on software modules associated with the various devices in the AV 104.

In one embodiment, the inertial measurements may cover one or more differentials of motion of the AV 104, and therefore, the location may be determined by performing integration functions in the software modules, and accordingly, may require integration constants to provide results. Further, the position estimation for the AV 104 may be determined as the maximum of a two-dimensional or a three-dimensional probability distribution which may be recomputed at any time step, taking into account the noise model of all the sensors and devices involved obstacles (for example, other vehicles and pedestrians). Based on the vehicle's 104 motion, the inertial measurement devices may be able to estimate the vehicle's 104 locations by one or more AI-based algorithms, for example, one or more machine learning algorithms.

In another aspect, environmental context 100 includes satellite 130 and one or more cellular towers 132. In another embodiment, the AV 104 may include a transceiver, which may in turn may include one or more location receivers (for example, GPS receivers) that may receive location signals (for example, GPS signals) from one or more satellites 130. In another embodiment, a GPS receiver may refer to a device that can receive information from GPS satellites (for example, satellites 130) and calculate the vehicle's 104 geographical position.

In various embodiments, the GPS receiver may be configured to use an L5 frequency band (for example, centered at approximately 1176.45 MHz) for higher accuracy location determination (for example, to pinpoint the vehicle 104 to approximately one-foot accuracy). In another embodiment, the location device may include the capability to detect location signals from one or more non-GPS based systems, for example, to increase the location accuracy determination. For example, the location device may be configured to receive one or more location signals from a Russian global navigation satellite system (GLONASS), a Chinese BeiDou navigation satellite system, a European Union Galileo positioning system, an Indian regional navigation satellite system (IRNSS), and/or a Japanese quasi-zenith satellite system, and the like.

Figure 2:
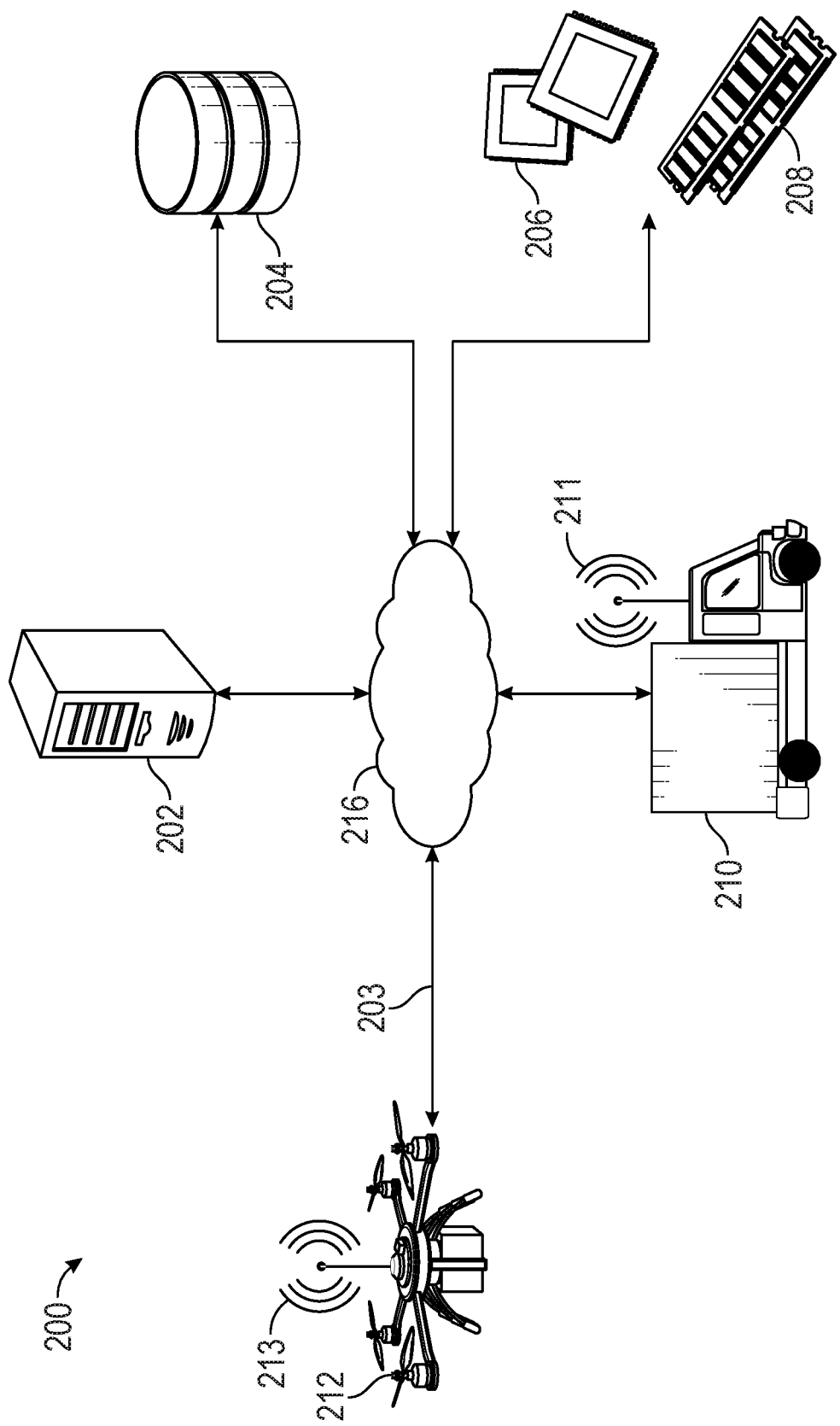
FIG. 2 shows a diagram of example components that may be used for the automated multimodal delivery, in accordance with example embodiments of the disclosure.

FIG. 2 shows a diagram of example components that may be used for the automated multimodal delivery, in accordance with example embodiments of the disclosure. In particular, diagram 200 shows computational resources including an exemplary server 202, a database 204, processor(s) 206, and memory 208. In some examples, these computational resources may be part of an external device that is in communication with the AV 210 over a network 216, or may be part of the AV 210 and/or a delivery vehicle such as a UAV. Diagram 200 further shows an AV 210 that may communicate using an antenna 211. Diagram 200 further includes a UAV 212 that may communicate using antenna 213. While a UAV 212 is depicted in diagram 200, is to be understood that a ground-based vehicle such as a robotic delivery vehicle may be used to perform the deliveries of the items and may communicate using an antenna similar to antenna 213. In various embodiments, the various components of diagram 200 may communicate 203 over a network 216, which may include wireless and/or wired networks as detailed further below.

In one aspect, the UAV 212 may include sensors for sensing or identifying objects or surfaces in an environment near the UAV 212. In one embodiment, the sensors may be used to obtain or detect identifying information on an item. For example, the sensors may include an optical sensor or tag reader configured to read identifying information from the tag or barcode. Example sensors may include a camera, RFID tag reader, laser barcode scanner, LIDAR sensors, RADAR sensors, image sensors, combinations thereof, and/or the like.

In one aspect, the UAV 212 may include an identification component (for example, an identification component including an image processing module similar to image processing module 335 shown and described in connection with FIG. 3, below) that is configured to identify one or more potential items for delivery to a user. In particular, the identification component may include, but not be limited to, one or more of a radio frequency identification (RFID) module, a barcode/QR code reader module, combinations thereof, and/or the like. For example, the sensors may scan/image each item or payload that the sensors encounter, and the identification component may identify each scanned/imaged item or payload based on the sensor data. In one embodiment, the identification component may identify an item by determining a serial number or other identifier corresponding to the item. For example, a tag or barcode may be read to determine the identity of an item. In one embodiment, the UAV 212 may receive instructions from the AV 210 to deliver a specific item and the identification component may identify items until a match for the specific item is found.

Based on the identity, or identifying information, the identification component may determine one or more characteristics for the item. In one embodiment, the identification component may determine a serial number or unique identifier for an item and then query, via a radio, a database for characteristics or requirements for the item. The identification component may determine one or more dimensions of an item. The dimensions may be needed to allow the UAV 212 to accommodate and/or hold the item. The identification component may identify a delivery location based on an identity of the item. In other examples, the identification component may receive data indicative of a delivery location for the item. For example, the identification component may receive such data from a third-party database communicating on a network. The delivery location may include an address, GPS location, or the like. The delivery location may include enough information to allow the UAV 212 to deliver the item.

In one aspect, the UAV 212 may include a size component that is configured to determine a dimension of the item. In other examples, the size component may receive data indicative of the dimensions of the item from a third-party database communicating on a network. For example, the size component may determine a vertical height, horizontal height, or depth of the item. The size component may determine the dimension based on data gathered by the identification component or may determine the size based on a camera image or other data.

In one embodiment, the UAV 212 may scan one or more items using a sensor that can read a quick response (QR) code, bar code, text, or the like to identify an item. For example, the UAV 212 may include a camera or other optical sensor. In one embodiment, the UAV 212 may scan the one or more items using another type of reader such as a RFID tag reader to read RFID tags on the products.

In various aspects, based on the identity of the package, box, or payload, the UAV 212 may determine metadata about the package. For example, the information read from the tag or code may include the metadata or may include a key to look up the metadata in a database or table. The metadata for the package, box, or payload may include a height of the package, a delivery location (for example, GPS or address information), or the like.

In another embodiment, the AV 210 may transmit a wireless signal using antenna 211. The wireless signal may be sent to a delivery vehicle such as UAV 212 using antenna 213 to instruct the UAV 212 to make the delivery. In some examples, the wireless signal may include an item identifier, a delivery destination, a delivery path, a delivery timing, instructions indicative of a post-delivery notification to a user device, and/or the like. A wireless signal may additionally be sent to a user device (for example, to inform the user regarding deliveries at the user's residence). The UAV 212, the AV 210, and/or the user device may be configured to communicate with the one or more devices of the vehicle using a network 216, wirelessly or wired. The network 216 may include, but not limited to, any one of a combination of different types of suitable communications networks such as, for example, broadcasting networks, public networks (for example, the Internet), private networks, wireless networks, cellular networks, or any other suitable private and/or public networks. Further, any of the communications networks may have any suitable communication range associated therewith and may include, for example, global networks (for example, the Internet), metropolitan area networks (MANs), wide area networks (WANs), local area networks (LANs), or personal area networks (PANs). In addition, any of the communications networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

As noted, the AV 210, and/or the delivery vehicles (for example, UAV 212) may include one or more communications antennae such as antenna 211 and antenna 213. The antennae may be any suitable type of antenna corresponding to the communications protocols used by the user device and the devices of the vehicle. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user device.

Further, the AV 210, and/or the delivery vehicles (for example, UAV 212) may include any suitable radio and/or transceiver for transmitting and/or receiving radio frequency (RF) signals in the bandwidth and/or channels corresponding to the communications protocols utilized by any of the user device and/or the vehicle devices to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (for example, white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Typically, when an AV 210 establishes communication with a user device or a UAV 212, the AV 210 may communicate in the downlink direction by sending data frames (e.g. a data frame which can comprise various fields such as a frame control field, a duration field, an address field, a data field, and a checksum field). The data frames may be preceded by one or more preambles that may be part of one or more headers. As noted, the data frames may include information such as an item identifier, a delivery destination, a delivery path, a delivery timing, instructions indicative of a post-delivery notification to a user device, and/or the like. These preambles may be used to allow the user device to detect a new incoming data frame from the vehicle device. A preamble may be a signal used in network communications to synchronize transmission timing between two or more devices (for example, between the vehicle and user device).

Diagram 200 further shows an example server 202 that may be in communication with the various other components (for example, the database 204, the processor(s) 206, the memory 208, the UAV 212, and/or the AV 210) over the network 216. In other examples (not shown), the database 204 may include the processors 206 and/or the memory 208 internally. In an embodiment, the server 202 may include a cloud-based server that may serve to store and transmit information (for example, images and video of a user, a user residence, and the like). Some or all of the individual components may be optional and/or different in various embodiments. In some embodiments, the server 202 may be located at the AV 210. In other examples, server 202 may be in communication with an AV 210, UAV 212, and/or user device (not shown). In some examples, the server 202 may include computer executable instructions on memory 208 that can be executed by processor 206 to determine, using various AI-based algorithms, a possibility and/or preferability of item delivery to a given location. In some examples, the server 202 and/or the database 204 may store a repository of images and/or information such as weather data, user preference data, and/or the like in order to support the delivery of the items to the location by the delivery vehicles. In this way, an AV such as AV 210 may not necessarily have to maintain records of residences, items and associated data locally but may query the database and/or the server to efficiently obtain such information and/or make a determination to deliver an item using a delivery vehicle.

Diagram 200 further shows an example database 204. In some examples, an AV such as AV 210 may analyze the residence layout by querying various databases such as database 204 to determine the availability of delivery sites and determine associated aerial delivery paths for UAV delivery along with corresponding tolerances. In other examples, an AV such as AV 210 may determine the past success rates of a UAV-based delivery under similar environmental conditions and/or may identify rate of user complaints from database 204 as part of the determination of the possibility of delivering the item using a delivery vehicle. In some examples, the disclosed systems may determine weather data from the database 204. The database 204 may be controlled by any suitable system, including a database management systems (DBMS), discussed further in connection with FIG. 7, below. The DBMS may use any of a variety of database models (for example, relational model, object model, etc.) and may support any of a variety of query languages to obtain information from database 204. In some examples, the database 204 may include a cloud-based database or a vehicle-based database.

Processor(s) 206 may include application processors, various coprocessors, and other dedicated processors for performing delivery analyses. Processor(s) 206 may be communicably coupled with memory 208 and configured to run the operating system, user interfaces, sensors, navigation system, communication system, image processing systems, and/or other components. In some embodiments, processor(s) 206 may include multiple dedicated or shared processors configured to perform signal processing, implement/manage real-time radio transmission operations of a delivery vehicle such as UAV 212, make navigation decisions (for example, compute flight paths, implement obstacle avoidance routines, etc.), and the like. The volatile and nonvolatile memories found in various embodiments may include storage media for storing information such as processor-readable instructions, data structures, program modules, or other data. Some examples of information that may be stored include basic input/output systems (BIOS), operating systems, and applications.

The various components illustrated in diagram 200 are merely representative components which may support the operations described herein. In one illustrative example, an AV such as AV 210 may obtain certain types of data (for example, obstacle data, local environmental data, and/or the like) associated with the location using AV-based sensors. The AV 210 may additionally obtain other types of data (for example, weather data, traffic data, optimal route data, crime statistics data, and/or the like) using servers 202 that may be in communication with databases 204. The servers 202 may control access to the data that may be stored on databases 204. Further, the AV 210 may query the server 202 to run various AI-based algorithms to make a determination of the possibility and/or preferability of making an item delivery to a location based on the collected data. The server 202 and/or the database 204 may run these algorithms using processors 206 and memory 208, which may be internal to the server 202 and/or database 204 may be externally located. All such components may communicate to one another over network 216. In other example embodiments, the disclosed systems may include these various components within an AV such as AV 210, a delivery vehicle such as UAV 212, and/or any other suitable device.

Figure 3:
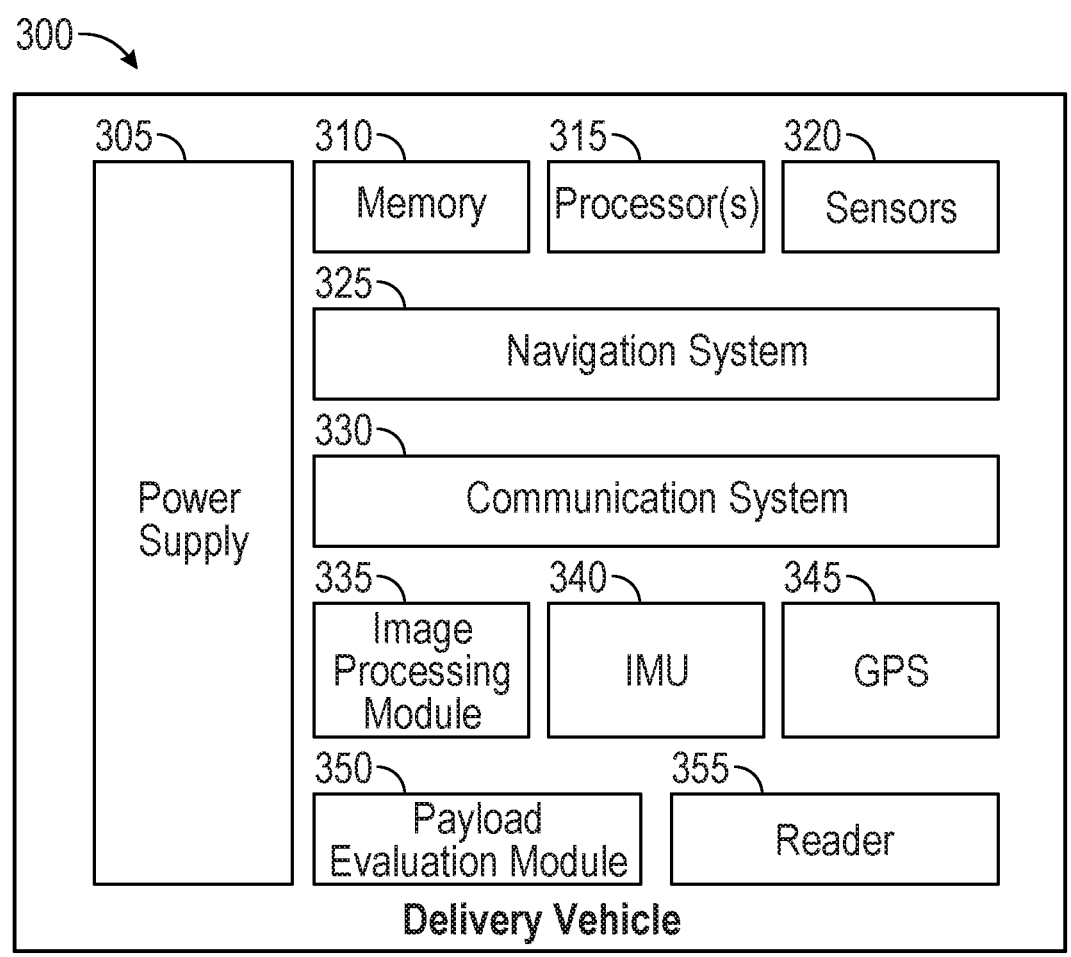
FIG. 3 illustrates a set of components within a delivery vehicle, in accordance with example embodiments of the disclosure.

FIG. 3 represents a diagram showing a set of components associated with a vehicle such as UAV or delivery robot, according to various embodiments of the disclosure. In particular, the delivery vehicle may include a power supply 305 (for example, battery), a memory 310 (for example, volatile memory and/or nonvolatile memory), processor(s) 315 for executing instructions and performing calculations, sensors 320, navigation system 325, communication system 330, image processing module 335, inertial measurement unit (IMU) 340, global positioning system (GPS) 345, item evaluation module 350, and fingerprint reader 355.

In one embodiment, the communication system 330 may also include one or more communications interfaces for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the communication system 330 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1×(1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Zigbee, Bluetooth protocols, wireless universal serial bus (USB) protocols, and/or any other wireless protocol.

Processor(s) 315 are the main processors of the delivery vehicle which may include application processors, various coprocessors, and other dedicated processors for operating the delivery vehicle. Processor(s) 315 may be communicably coupled with memory 310 and configured to run the operating system, user interfaces, sensors 320, navigation system 325, communication system 330, image processing module 335, and/or other components. In some embodiments, processor(s) 315 may include multiple dedicated or shared processors configured to perform signal processing (e.g. baseband processors for cellular communications), implement/manage real-time radio transmission operations of the UAV, make navigation decisions (for example, compute flight paths, ground-based routes, implement obstacle avoidance routines, etc.). These processors along with the other components may be powered by power supply 305. The volatile and nonvolatile memories found in various embodiments may include storage media for storing information such as processor-readable instructions, data structures, program modules, or other data. Some examples of information that may be stored include basic input/output systems (BIOS), operating systems, and applications.

Sensors 320 may be used to detect events or changes in the surrounding environment and produce a corresponding signal that can be acted upon by various components within the delivery vehicle or transmitted to the AV. In some embodiments, sensors 320 may include one or more of the following: a microphone, a camera, a thermostat, an accelerometer, light sensors, motion sensors, moisture sensors, fingerprint readers, retinal scanners, chemical sensors, scales, LIDAR, RADAR, and the like. Several of these sensors, for example, may be used as part of the navigation system 325. As another example, battery life can vary significantly based on temperature. As such, the temperature reading from the thermostat may be used to more accurately predict the range of the delivery vehicle. In some embodiments, the signal generated by the microphone can be used to determine the noise level of the surrounding environment and to record a voice message or identification from a user inserting or removing a package. The microphones may be used to perform acoustic-based detection of an animal, as described in connection with FIG. 1, above. Still yet, sensors 320 may include credit card readers for accepting payments from users using user devices, including Bluetooth or near field communication (NFC) systems.

The navigation system 325 can be responsible for determining the flight path of a UAV or the route of a delivery robot. In some embodiments, high-level instructions or pick-up/drop-off locations can be communicated to the delivery vehicle via the communication system 330. The navigation system 325 may receive inputs from multiple sensors 320 (for example, accelerometers, gyroscopes, LIDAR, RADAR, etc.), image processing module 335, IMU 340, and/or GPS 345 to determine optimal flight paths, detect and avoid objects, coordinate with the AV using the communication system 330, and the like. For example, IMU 340 can determine the delivery vehicle's orientation and velocity.

According to one embodiment, the navigation system 325 may include location determining aspects, devices, modules, functionalities, and/or similar words used herein interchangeably. For example, the navigation system 325 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the UAV's position in connection with a variety of other systems, including cellular towers, Wi-Fi access points, and/or the like. Similarly, the navigation system 325 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (for example smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

As noted, FIG. 3 illustrates a set of components within a delivery vehicle. In one embodiment, packages may refer to one or more items. In another aspect, the delivery vehicle may include an item evaluation module 350 that can use input from sensors 320, image processing module 335, and/or fingerprint reader 355 to determine whether to deliver the package to the user. For example, item evaluation module 350 may request user authentication via a reader 355 (for example, fingerprint reader) and/or another biometric reader. If the reading does not match the record on file (for example, from an initial registration with the delivery system or other third-party servers), then the item evaluation module 350 may determine to not deliver the item(s). As another example, a scale may be used to measure the weight of the item. If the item evaluation module 350 determines that the package exceeds a maximum weight for a UAV, then the item may not be delivered using the UAV. In other examples, the heavy item may be delivered using a delivery robot.

Figure 4:
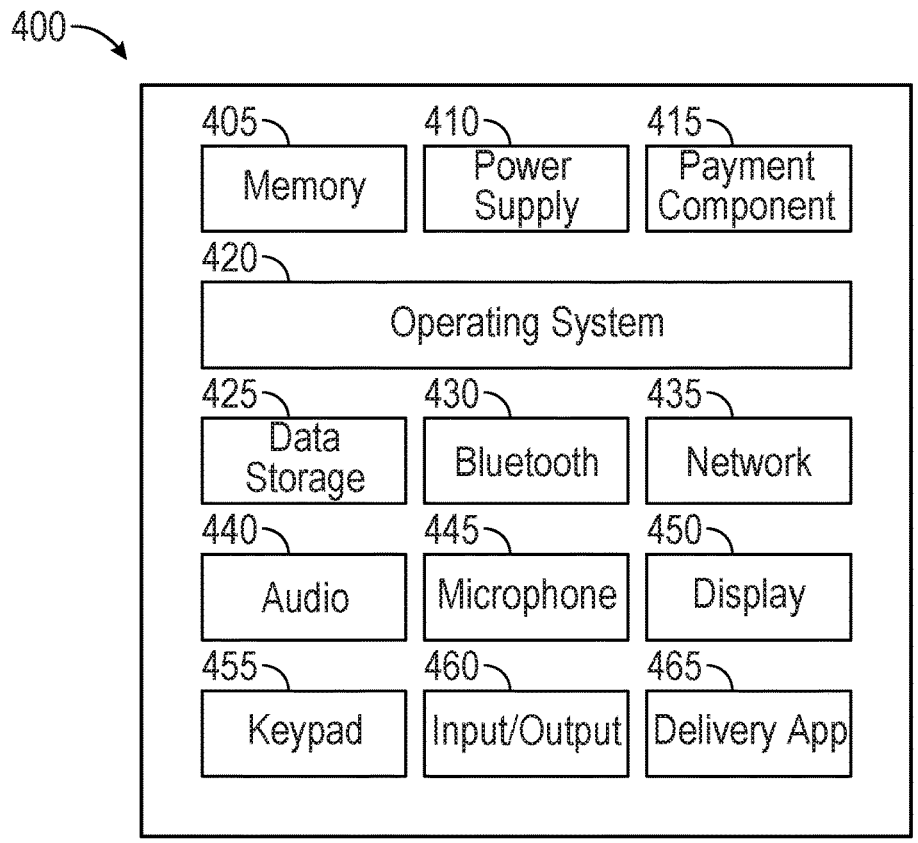
FIG. 4 illustrates a set of components within a mobile device having a delivery application, in accordance with example embodiments of the disclosure.

FIG. 4 illustrates a set of components within a mobile device with delivery application according to various embodiments of the disclosure. The mobile device 400 may include a delivery application 465 that may be used in connection with a delivery vehicle to configure aspects of the delivery. As shown in FIG. 4, mobile device 400 may include memory 405 (for example, volatile memory and/or nonvolatile memory), power supply 410 (for example, battery), processor(s) (not shown) for executing processing instructions, payment component 415, and operating system 420. Additional components such as data storage component 425 (for example, hard drive, flash memory, memory card, etc.), one or more network interfaces (for example, Bluetooth Interface 430; and network communication interface 435, which enables the mobile phone to communicate by transmitting and receiving wireless signals using licensed, semi-licensed or unlicensed spectra over a telecommunications network), audio interface 440, microphone 445, display 450, keypad or keyboard 455, and other input and/or output interfaces 460 (e.g. a fingerprint reader or other biometric sensor/security feature). The various components of a mobile device may be interconnected via a bus.

In various embodiments, the payment component 415 may be configured to operate with a point-of-sale device associated with the delivery vehicle. The point-of-sale device may be capable of executing a transaction (for example, an electronic fund transaction) using one or more of a magnetic strip, chip, and NFC device. In another embodiment, a wireless communication device can allow for the payment component to receive payment confirmations. In another aspect, the delivery vehicle may include an onboard payment component such as a point-of-sale device to provide a variety of methods to provide payment. For example, the payment component of the delivery vehicle may allow for a swipe and/or tap a card or device, scan a QR code to allow for payment over cloud servers, and may feature a touch screen to allow the user to interact with the payment component.

Processor(s) (not shown) are the main processors of mobile device 400, and they may include application processors, baseband processors, various coprocessors, and other dedicated processors for operating mobile device 400. For example, an application processor can provide the processing power to support software applications, memory management, graphics processing, and multimedia. An application processor may be communicably coupled with memory 405 and configured to run the operating system, the user interface, and the applications stored on memory 405 or data storage component 425. A baseband processor may be configured to perform signal processing and implement/manage real-time radio transmission operations of mobile device 400. These processors along with the other components may be powered by power supply 410. The volatile and nonvolatile memories found in various embodiments may include storage media for storing information such as processor-readable instructions, data structures, program modules, or other data. Some examples of information that may be stored include BIOS, operating systems, and applications.

In accordance with some embodiments, the delivery application 465 may be installed on mobile device 400. Delivery application 465 may be used to register a user, confirm pick-up/drop-off locations and/or times, convey the current location of a delivery UAV, provide real-time video or images from a delivery done, receive feedback from users, reschedule pick-up/drop-off times/locations, and the like.

Figure 5:
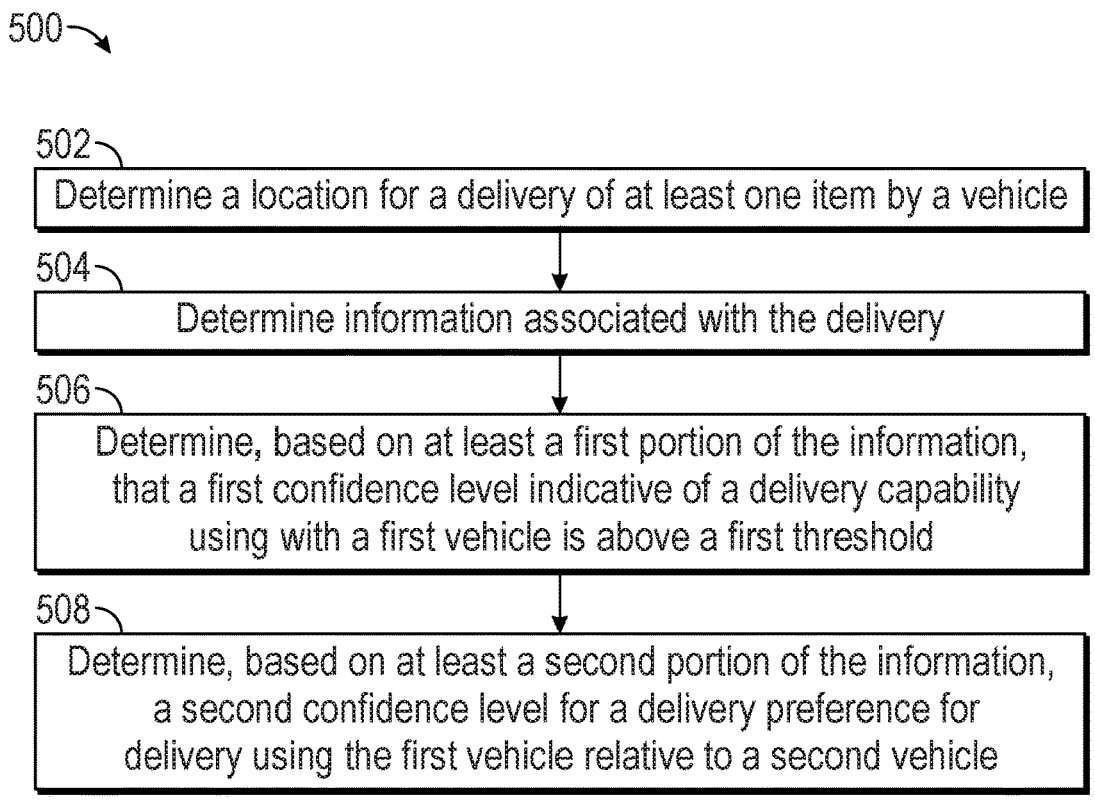
FIG. 5 shows an example process flow describing a method of automated multimodal delivery, in accordance with example embodiments of the disclosure.

FIG. 5 shows an example process flow describing a method of automated multimodal delivery, in accordance with example embodiments of the disclosure. At block 502, the method may include determining a location for a delivery of at least one item. The vehicle can be referred to as a first vehicle and may include an AV. The first vehicle may be coupled to or be in communication with a second vehicle. The second vehicle can be either physically coupled, integrated with, and separable from the AV or can be a separate entity than the AV. As noted, the second vehicle may include a UAV, a ground-based delivery robot, and/or the like.

At block 504, the method may include determining information associated with the delivery. In some examples, the disclosed systems may determine the information by transmitting a request for the information from a cloud-based server, a vehicle-based database, sensors of the vehicle, and/or the like. The information can include at least one of: an image of the location, an aerial photograph of the location, a road condition report, a weather report, a wind speed at the location, crime data associated with the location, a historical delivery report associated with at least one previous delivery to the location, a user profile associated with at least one user residing at the location, a delivery time, a presence of the user at the location, a presence of additional vehicles at the location, an item-size characteristic, an item-weight characteristic, a tree coverage at the location, a distance between the vehicle and the location, or the like.

At block 506, the method may include determining, based on at least a first portion of the information, that a first confidence level indicative of a delivery capability with a first vehicle is above a first threshold. In some examples, determining the first confidence level can be based on at least one of a historical success rate of deliveries to the location or a user complaint rate, or determining that a delivery route is blocked. The disclosed systems may use such information in generating a score associated with the possibility of delivering the item to the location using the first vehicle. In other embodiments, the disclosed systems may use a decision tree to determine that the first confidence level is above the first threshold, as further described in connection with FIG. 1, above.

At block 508, the method may include determining, based on at least a second portion of the information, a second confidence level indicative of a delivery preference for delivery using the first vehicle relative to a second vehicle. The disclosed systems can further send an instruction to the second vehicle to perform the delivery to the location. In some examples, the disclosed systems can send the instruction to the second vehicle to perform the delivery if the second vehicle is preferred. The disclosed systems can determine that the second confidence level is below a second threshold and can generate a delivery report. In other examples, the disclosed systems can generate the delivery report based on the first confidence level being below the first threshold. In either case, the disclosed systems can provide rationale to a user of why the delivery may not be possible or preferable. For example, the delivery report can include at least one reason that the second confidence level is below the second threshold, and the disclosed systems can transmit the delivery report to a user device. The disclosed systems can then schedule a second delivery of the item to the location, for example, by using input received from the user device.

Figure 6:
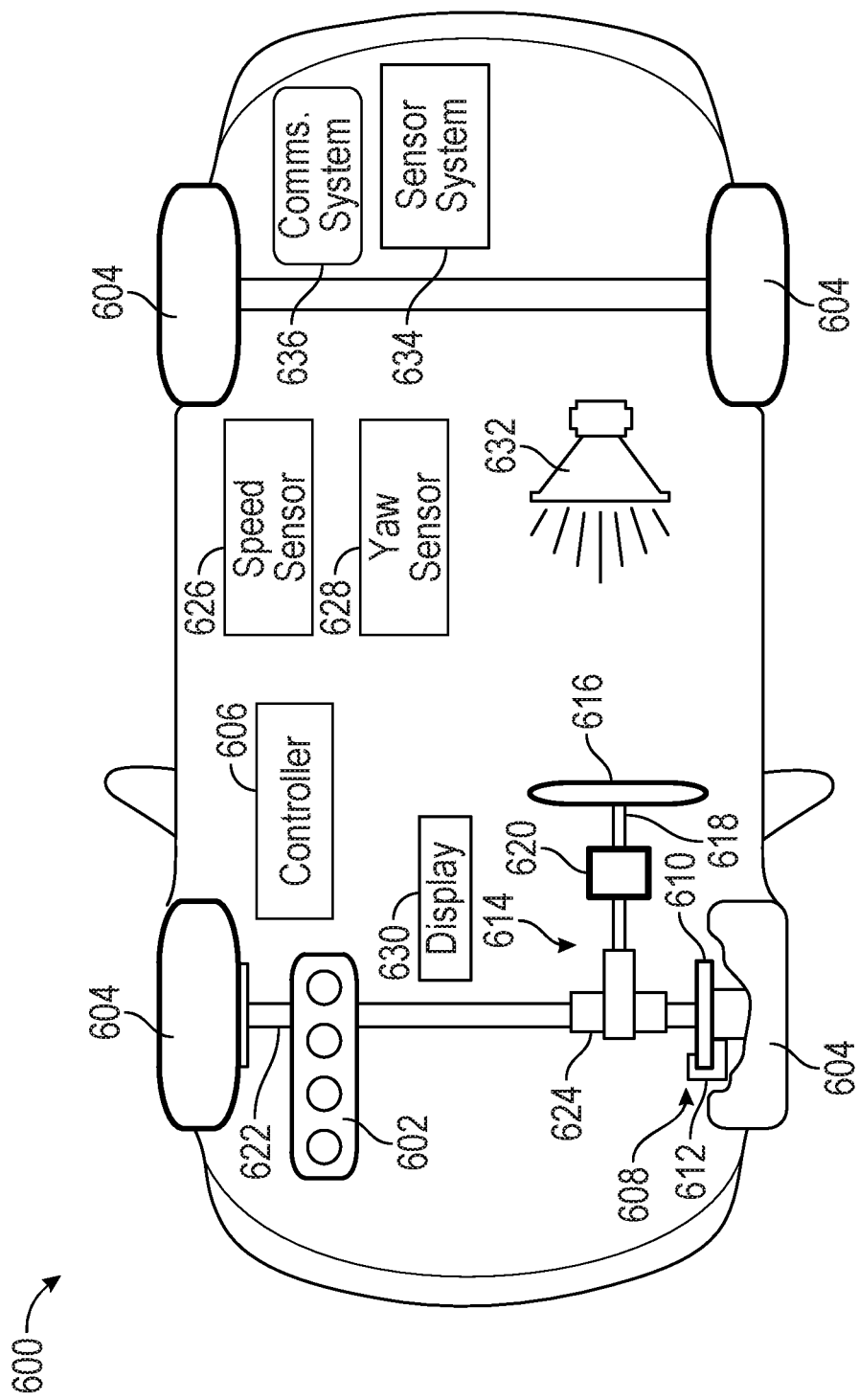
FIG. 6 is a schematic illustration of an example AV for automated multimodal delivery, in accordance with one or more embodiments of the disclosure.

FIG. 6 is a schematic illustration of an example autonomous vehicle in accordance with one or more embodiments of the disclosure. As noted, the vehicle (for example, AV 104 or 210 shown and described in connection with FIGS. 1 and 2, above), may include an AV. Referring to FIG. 6, an example AV 600 may include a power plant 602 (such as a combustion engine and/or an electric motor) that provides torque to driven wheels 604 that propel the vehicle forward or backward.

Autonomous vehicle operation, including propulsion, steering, braking, navigation, and the like, may be controlled autonomously by a vehicle controller 606. For example, the vehicle controller 606 may be configured to receive feedback from one or more sensors (for example, sensor system 634, etc.) and other vehicle components to determine road conditions, vehicle positioning, and so forth. The vehicle controller 606 may also ingest data form various sensors such as speed monitor and yaw sensor, as well as the tires, brakes, motor, and other vehicle components. The vehicle controller 606 may use the feedback and route/map data of the route to determine actions to be taken by the autonomous vehicle, which may include operations related to the engine, steering, braking, and so forth. Control of the various vehicle systems may be implemented using any suitable mechanical means, such as servo motors, robotic arms (for example, to control steering wheel operation, acceleration pedal, brake pedal, etc.), and so forth. The controller 606 may be configured to interact with the user by communicating with the user's user device.

The vehicle controller 606 may include one or more computer processors coupled to at least one memory. The vehicle 600 may include a braking system 608 having disks 610 and calipers 612. The vehicle 600 may include a steering system 614. The steering system 614 may include a steering wheel 616, a steering shaft 618 interconnecting the steering wheel to a steering rack 620 (or steering box). The front and/or rear wheels 604 may be connected to the steering rack 620 via axle 622. A steering sensor 624 may be disposed proximate the steering shaft 618 to measure a steering angle. The vehicle 600 also includes a speed sensor 626 that may be disposed at the wheels 604 or in the transmission. The speed sensor 626 is configured to output a signal to the controller 606 indicating the speed of the vehicle. A yaw sensor 628 is in communication with the controller 606 and is configured to output a signal indicating the yaw of the vehicle 600.

The vehicle 600 includes a cabin having a display 630 in electronic communication with the controller 606. The display 630 may be a touchscreen that displays information to the passengers of the vehicle and/or functions as an input. A person having ordinary skill in the art will appreciate that many different display and input devices are available and that the present disclosure is not limited to any particular display. An audio system 632 may be disposed within the cabin and may include one or more speakers for providing information to users that pickup items. The audio system 632 may also include a microphone for receiving voice inputs or detecting sounds at the residence (for example, animal sounds). The vehicle may include a communications system 636 that is configured to send and/or receive wireless communications via one or more networks. The communications system 636 may be configured for communication with devices in the car or outside the car, such as a user's device, the delivery vehicles, etc.

The vehicle 600 may also include a sensor system for sensing areas external to the vehicle, such as user residences, animals, users, driveways, and the like (shown and described in connection with FIG. 1, above). The sensor system may include a plurality of different types of sensors and devices such as cameras, ultrasonic sensors, RADAR, LIDAR, microphones, and/or combinations thereof. The sensor system may be in electronic communication with the controller 606 for controlling the functions of various components. The controller may communicate via a serial bus or via dedicated electrical conduits. The controller generally includes any number of microprocessors, ASICs, ICs, memory (for example, FLASH, ROM, RAM, EPROM and/or EEPROM) and software code to co-act with one another to perform a series of operations. The controller also includes predetermined data, or "look up tables" that are based on calculations and test data and are stored within the memory. The controller may communicate with other vehicle systems and controllers over one or more wired or wireless vehicle connections using common bus protocols (for example, CAN and LIN). Used herein, a reference to "a controller" refers to one or more controllers and/or computer processors. The controller 606 may receive signals from the sensor system 634 and may include memory containing machine-readable instructions for processing the data from the sensor system. The controller 606 may be programmed to output instructions to at least the display 630, the audio system 632, the steering system 614, the braking system 608, and/or the power plant 602 to autonomously operate the vehicle 600.

Figure 7:
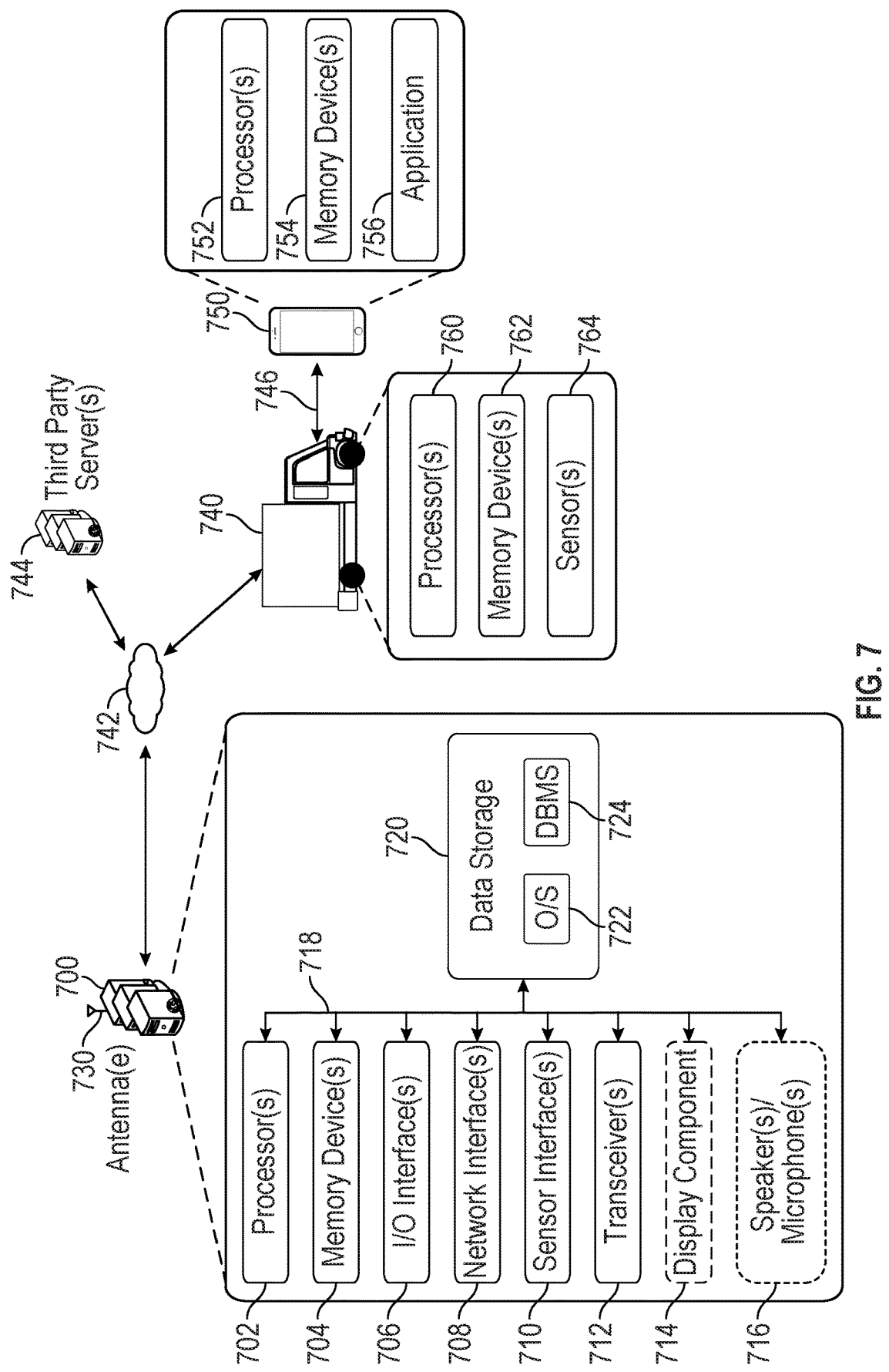
FIG. 7 is a schematic illustration of an example server architecture for one or more servers that can be used for automated multimodal delivery, in accordance with one or more embodiments of the disclosure.

FIG. 7 is a schematic illustration of an example server architecture for one or more server(s) 700 in accordance with one or more embodiments of the disclosure. In some examples, server 700 may be similar to server 202 shown and described in connection with FIG. 2, above. The server 700 illustrated in the example of FIG. 7 may correspond to a server that may be used by a vehicle (for example, vehicle 104 as shown and described in connection with FIG. 1, above), and/or on a network associated with the vehicle, a delivery vehicle, or a user device. In an embodiment, the server 700 may include a cloud-based server that may serve to store and transmit information (for example, images and video of a user, a user residence, and the like). Some or all of the individual components may be optional and/or different in various embodiments. In some embodiments, at least one of the servers described FIG. 7 may be located at or in communication with an AV.

The server 700 may be in communication with an AV 740, and one or more user devices 750. The AV 740 may be in communication with the one or more user devices 750. Further, the server 700, the AV 740, and/or the user devices 750 may be configured to communicate via one or more networks 742. The AV 740 may additionally be in wireless communication over one or more network(s) 742 with the user devices 750 via a connection protocol such as Bluetooth or NFC. Such network(s) 742 may include, but are not limited to, any one or more different types of communications networks such as, for example, cable networks, public networks (for example, the Internet), private networks (for example, frame-relay networks), wireless networks, cellular networks, telephone networks (for example, a public switched telephone network), or any other suitable private or public packet-switched or circuit-switched networks. Further, such network(s) may have any suitable communication range associated therewith. In addition, such network(s) may include communication links and associated networking devices (for example, link-layer switches, routers, etc.) for transmitting network traffic over any suitable type of medium including, but not limited to, coaxial cable, twisted-pair wire (for example, twisted-pair copper wire), optical fiber, a HFC medium, a microwave medium, a radio frequency communication medium, a satellite communication medium, or any combination thereof.

In an illustrative configuration, the server 700 may include one or more processors 702, one or more memory devices 704 (also referred to herein as memory 704), one or more input/output (I/O) interface(s) 706, one or more network interface(s) 708, one or more sensor(s) or sensor interface(s) 710, one or more transceiver(s) 712, one or more optional display components 714, one or more optional speakers(s)/camera(s)/microphone(s) 716, and data storage 720. The server 700 may further include one or more bus(es) 718 that functionally couple various components of the server 700. The server 700 may further include one or more antenna(e) 730 that may include, without limitation, a cellular antenna for transmitting or receiving signals to/from a cellular network infrastructure, a GNSS antenna for receiving GNSS signals from a GNSS satellite, a Bluetooth antenna for transmitting or receiving Bluetooth signals, a NFC antenna for transmitting or receiving NFC signals, and so forth. These various components will be described in more detail hereinafter.

The bus(es) 718 may include at least one of a system bus, a memory bus, an address bus, or a message bus, and may permit the exchange of information (for example, data (including computer-executable code), signaling, etc.) between various components of the server 700. The bus(es) 718 may include, without limitation, a memory bus or a memory controller, a peripheral bus, an accelerated graphics port, and so forth. The bus(es) 718 may be associated with any suitable bus architecture.

The memory 704 of the server 700 may include volatile memory (memory that maintains its state when supplied with power) such as RAM and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (for example, FRAM) may enable faster read/write access than certain types of volatile memory.

The data storage 720 may include removable storage and/or non-removable storage including, but not limited to, magnetic storage, optical disk storage, and/or tape storage. The data storage 720 may provide non-volatile storage of computer-executable instructions and other data.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to the memory 704 for use by the processor(s) 702 during the execution of the computer-executable instructions. More specifically, the data storage 720 may store one or more operating systems (O/S) 722; one or more database management systems (DBMS) 724; and one or more program module(s), applications, engines, computer-executable code, scripts, or the like. Some or all of these component(s) may be sub-component(s). Any of the components depicted as being stored in the data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in the data storage 720 may support functionality described in reference to corresponding components named earlier in this disclosure.

The processor(s) 702 may be configured to access the memory 704 and execute the computer-executable instructions loaded therein. For example, the processor(s) 702 may be configured to execute the computer-executable instructions of the various program module(s), applications, engines, or the like of the server 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit.

Referring now to other illustrative components depicted as being stored in the data storage 720, the O/S 722 may be loaded from the data storage 720 into the memory 704 and may provide an interface between other application software executing on the server 700 and the hardware resources of the server 700.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (for example, relational model, object model, etc.) and may support any of a variety of query languages.

Referring now to other illustrative components of the server 700, the input/output (I/O) interface(s) 706 may facilitate the receipt of input information by the server 700 from one or more I/O devices as well as the output of information from the server 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. The I/O interface(s) 706 may also include a connection to one or more of the antenna(e) 730 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The server 700 may further include one or more network interface(s) 708 via which the server 700 may communicate with any of a variety of other systems, platforms, networks, devices, and so forth. The network interface(s) 708 may enable communication, for example, with one or more wireless routers, one or more host servers, one or more web servers, and the like via one or more networks.

The sensor(s)/sensor interface(s) 710 may include or may be capable of interfacing with any suitable type of sensing device such as, for example, inertial sensors, force sensors, thermal sensors, photocells, and so forth.

The display component(s) 714 may include one or more display layers, such as LED or LCD layers, touch screen layers, protective layers, and/or other layers. The optional camera(s) of the speakers(s)/camera(s)/microphone(s) 716 may be any device configured to capture ambient light or images. The optional microphone(s) of the speakers(s)/camera(s)/microphone(s) 716 may be any device configured to receive analog sound input or voice data. The microphone(s) of the speakers(s)/camera(s)/microphone(s) 716 may include microphones used to capture sound.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module.

It should further be appreciated that the server 700 may include alternate and/or additional hardware, software, or firmware components beyond those described or depicted without departing from the scope of the disclosure.

The user device 750 may include one or more computer processor(s) 752, one or more memory devices 754, and one or more applications, such as a vehicle application 756. Other embodiments may include different components.

The processor(s) 752 may be configured to access the memory 754 and execute the computer-executable instructions loaded therein. For example, the processor(s) 752 may be configured to execute the computer-executable instructions of the various program module(s), applications, engines, or the like of the device to cause or facilitate various operations to be performed in accordance with one or more embodiments of the disclosure. The processor(s) 752 may include any suitable processing unit capable of accepting data as input, processing the input data in accordance with stored computer-executable instructions, and generating output data. The processor(s) 752 may include any type of suitable processing unit.

The memory 754 may include volatile memory (memory that maintains its state when supplied with power). Persistent data storage, as that term is used herein, may include non-volatile memory. In certain example embodiments, volatile memory may enable faster read/write access than non-volatile memory. However, in certain other example embodiments, certain types of non-volatile memory (for example, FRAM) may enable faster read/write access than certain types of volatile memory.

Referring now to functionality supported by the user device 750, the AV application 756 may be a mobile application executable by the processor 752 that can be used to present options and/or receive user inputs of information related to the disclosed embodiments. In addition, the user device 750 may communicate with the AV 740 via the network 742 and/or a direct connect, which may be a wireless or wired connection. The user device 750 may include a camera, scanner, bio reader or the like to capture biometric data of a user, perform certain processing step on the biometric date, such as extracting features from captured biometric data, and then communicating those extracted features to one or more remote servers, such as one or more of cloud-based servers.

The autonomous vehicle 740 may include one or more computer processor(s) 760, one or more memory devices 762, one or more sensors 764, and one or more applications, such as an autonomous driving application 766. Other embodiments may include different components. A combination or sub combination of these components may be integral to the controller 606 in FIG. 6. The autonomous vehicle 740 may additionally be in wireless communication 746 with the user device 750 via a connection protocol such as Bluetooth or Near Field Communication.

The processor(s) 760 may be configured to access the memory 762 and execute the computer-executable instructions loaded therein. For example, the processor(s) 760 may be configured to execute the computer-executable instructions of the various program module(s), applications, engines, or the like of the device to cause or facilitate various operations to be performed in accordance with one or more embodiments of the disclosure. The processor(s) 760 may include any suitable processing unit capable of accepting data as input, processing the input data in accordance with stored computer-executable instructions, and generating output data. The processor(s) 760 may include any type of suitable processing unit.

The memory 762 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module.

It should further be appreciated that the server 700 may include alternate and/or additional hardware, software, or firmware components beyond those described or depicted without departing from the scope of the disclosure.

Example embodiments of the disclosure may include one or more of the following examples:

Example 1 may include a method for item delivery is described: determining a location for a delivery of at least one item; determining information associated with the delivery; determining, based on at least a first portion of the information, that a first confidence level indicative of a delivery capability using a first vehicle is above a first threshold; and determining, based on at least a second portion of the information, a second confidence level indicative of a delivery preference for delivery using the first vehicle relative to a second vehicle.

Example 2 may include the method of example 1, and/or some other example herein, further comprising sending, based on at least the second confidence level, an instruction to the first vehicle to perform the delivery to the location.

Example 3 may include the method of example 2 and/or some other example herein, wherein the first vehicle is an autonomous vehicle (AV), and the second vehicle is an unmanned aerial vehicle (UAV) or a robotic vehicle.

Example 4 may include the method of example 1 and/or some other example herein, further comprising sending, based on at least the second confidence level, an instruction to the second vehicle to perform the delivery to the location.

Example 5 may include the method of example 1 and/or some other example herein, further comprising: determining that the second confidence level is below a second threshold; generating a delivery report, the delivery report including at least one reason that the second confidence level is below the second threshold; transmitting the delivery report to a user device; and scheduling a delivery of the item to the location.

Example 6 may include the method of example 1 and/or some other example herein, wherein determining the first confidence level further comprises at least one of: determining at least one of a historical success rate of deliveries to the location or a user complaint rate, or determining that a delivery route is blocked.

Example 7 may include the method of example 1 and/or some other example herein, wherein the information comprises at least one of: an image of the location, an aerial photograph of the location, a road condition report, a weather report, a wind speed at the location, crime data associated with the location, a historical delivery report associated with at least one previous delivery to the location, a user profile associated with at least one user residing at the location, a delivery time, a presence of the user at the location, a presence of delivery vehicles at the location, an item-size characteristic, an item-weight characteristic, a tree coverage at the location, or a distance between the vehicle and the location.

Example 8 may include the method of example 1 and/or some other example herein, wherein determining the information comprises transmitting a request for at least a portion of the information from at least one of a cloud-based server, a vehicle-based database, or at least one sensor of the vehicle.

Example 9 may include a device for item delivery, comprising: at least one memory device that stores computer-executable instructions; and at least one processor configured to access the at least one memory device, wherein the processor is configured to execute the computer-executable instructions to: determine a location for a delivery of at least one item; determine information associated with the delivery; determine, based on at least a first portion of the information, that a first confidence level indicative of a delivery capability using a first vehicle is above a first threshold; and determine, based on at least a second portion of the information, a second confidence level indicative of a delivery preference for delivery using the first vehicle relative to a second vehicle.

Example 10 may include the device of example 9 and/or some other example herein, further comprising computer-executable instructions that cause the processor to send based on at least the second confidence level, an instruction to the first vehicle to perform the delivery to the location.

Example 11 may include the device of example 10 and/or some other example herein, wherein the first vehicle is an autonomous vehicle (AV), and the second vehicle is an unmanned aerial vehicle (UAV) or a robotic vehicle, and wherein the second vehicle is physically coupled to and integratable with the AV.

Example 12 may include the device of example 9 and/or some other example herein, further comprising computer-executable instructions that cause the processor to: determining that the second confidence level is below a second threshold; generating a delivery report, the delivery report including at least one reason that the second confidence level is below the second threshold; transmitting the delivery report to a user device; and scheduling a delivery of the item to the location.

Example 13 may include the device of example 9 and/or some other example herein, wherein determining the first confidence level further comprises at least one of: determining at least one of a historical success rate of deliveries to the location or a user complaint rate, or determining that a delivery route is blocked.

Example 14 may include the device of example 9 and/or some other example herein, wherein the information comprises at least one of: an image of the location, an aerial photograph of the location, a road condition report, a weather report, a wind speed at the location, crime data associated with the location, a historical delivery report associated with at least one previous delivery to the location, a user profile associated with at least one user residing at the location, a delivery time, a presence of the user at the location, a presence of delivery vehicles at the location, an item-size characteristic, an item-weight characteristic, a tree coverage at the location, or a distance between the vehicle and the location.

Example 15 may include a non-transitory computer-readable medium storing computer-executable instructions which, when executed by a processor, cause the processor to perform operations comprising: determining a location for a delivery of at least one item; determining information associated with the delivery; determining, based on at least a first portion of the information, that a first confidence level indicative of a delivery capability using a first vehicle is above a first threshold; and determining, based on at least a second portion of the information, a second confidence level indicative of a delivery preference for delivery using the first vehicle relative to a second vehicle.

Example 16 may include the non-transitory computer-readable medium of example 15 and/or some other example herein, further comprising operations to send based on at least the second confidence level, an instruction to the first vehicle to perform the delivery to the location.

Example 17 may include the non-transitory computer-readable medium of example 16 and/or some other example herein, wherein the first vehicle is an autonomous vehicle (AV), and the second vehicle is an unmanned aerial vehicle (UAV) or a robotic vehicle, and wherein the second vehicle is physically coupled to and integratable with the AV.

Example 18 may include the non-transitory computer-readable medium of example 15 and/or some other example herein, further comprising operations for: determining that the second confidence level is below a second threshold; generating a delivery report, the delivery report including at least one reason that the second confidence level is below the second threshold; transmitting the delivery report to a user device; and scheduling a delivery of the item to the location.

Example 19 may include the non-transitory computer-readable medium of example 15 and/or some other example herein, wherein determining the first confidence level further comprises at least one of: determining at least one of a historical success rate of deliveries to the location or a user complaint rate, or determining that a delivery route is blocked.

Example 20 may include the non-transitory computer-readable medium of example 15 and/or some other example herein, wherein the information comprises at least one of: an image of the location, an aerial photograph of the location, a road condition report, a weather report, a wind speed at the location, crime data associated with the location, a historical delivery report associated with at least one previous delivery to the location, a user profile associated with at least one user residing at the location, a delivery time, a presence of the user at the location, a presence of delivery vehicles at the location, an item-size characteristic, an item-weight characteristic, a tree coverage at the location, or a distance between the vehicle and the location.

Example 20 may include an apparatus comprising means for performing a method as claimed in any of the preceding examples.

Example 21 may include machine-readable storage including machine-readable instructions, when executed, to implement a method as claimed in any preceding example.

Example 22 may include machine-readable storage including machine-readable instructions, when executed, to implement a method or realize an apparatus as claimed in any preceding example.

Example 23 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 24 may include an apparatus comprising logic, modules, and/or circuitry to perform one or more elements of a method described in or related to any of examples 1-20, or any other method or process described herein.

Example 25 may include a method, technique, or process as described in or related to any of examples 1-20, or portions or parts thereof.

Example 26 may include an apparatus comprising: one or more processors and one or more computer readable media comprising instructions that, when executed by the one or more processors, cause the one or more processors to perform the method, techniques, or process as described in or related to any of examples 1-20, or portions thereof.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (for example, pre-established or fixed) or dynamic (for example, created or modified at the time of execution).

Software components may invoke or be invoked by other software components through any of a wide variety of mechanisms. Invoked or invoking software components may comprise other custom-developed application software, operating system functionality (for example, device drivers, data storage (for example, file management) routines, other common routines and services, etc.), or third-party software components (for example, middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for item delivery, comprising:
    determining, by a processor, a location for a delivery of at least one item;
    determining, by the processor, information associated with the delivery;
    causing, by the processor, a first vehicle to navigate the at least one item, a second vehicle, and a third vehicle to a delivery location, wherein the first vehicle is an autonomous vehicle (AV), the second vehicle is an unmanned aerial vehicle (UAV), and the third vehicle is a ground-based robotic vehicle;
    determining, by the processor, a first score associated with a first obstacle between the first vehicle and a drop-off location, wherein the first score is provided a first weight;
    determining, by the processor, a second score associated with a second obstacle between the first vehicle and the drop-off location, wherein the second score is provided a second weight;
    determining, by the processor, a first confidence level indicative of a delivery capability using the second vehicle based on the first score and the second score;
    determining, by the processor, that the first confidence level is above a first threshold;
    determining, by the processor and based on at least a portion of the information, a second confidence level indicative of a delivery capability using the third vehicle is below the first threshold; and
    causing, by the processor and based on the first confidence level and the second confidence level, the first vehicle to dispatch the second vehicle to perform the delivery to a drop-off location at the delivery location instead of the third vehicle.

2. The method of claim 1, further comprising:
    determining that the second confidence level is below a second threshold;
    generating a delivery report, the delivery report including at least one reason that the second confidence level is below the second threshold;
    transmitting the delivery report to a user device; and
    scheduling a delivery of the item to the location.

3. The method of claim 1, wherein determining the first confidence level further comprises at least one of:
    determining at least one of a historical success rate of deliveries to the location or a user complaint rate; or
    determining that a delivery route is blocked.

4. The method of claim 1, wherein the information comprises at least one of: an image of the location, an aerial photograph of the location, a road condition report, a weather report, a wind speed at the location, crime data associated with the location, a historical delivery report associated with at least one previous delivery to the location, a user profile associated with at least one user residing at the location, a delivery time, a presence of the user at the location, a presence of delivery vehicles at the location, an item-size characteristic, an item-weight characteristic, a tree coverage at the location, or a distance between the first vehicle, second vehicle, and/or third vehicle and the location.

5. The method of claim 1, wherein determining the information comprises transmitting a request for at least a portion of the information from at least one of a cloud-based server, a vehicle-based database, or at least one sensor of the first vehicle, second vehicle, and/or third vehicle.

6. A device for item delivery, comprising:
    at least one memory device that stores computer-executable instructions; and
    at least one processor configured to access the at least one memory device, wherein the processor is configured to execute the computer-executable instructions to:
    determine a location for a delivery of at least one item;
    determine information associated with the delivery;
    cause a first vehicle to navigate the at least one item, a second vehicle, and a third vehicle to a delivery location, wherein the first vehicle is an autonomous vehicle (AV), and the second vehicle is an unmanned aerial vehicle (UAV), and wherein the third vehicle is a ground-based robotic vehicle;
    determine a first score associated with a first obstacle between the first vehicle and a drop-off location, wherein the first score is provided a first weight;
    determine a second score associated with a second obstacle between the first vehicle and the drop-off location, wherein the second score is provided a second weight;
    determine a first confidence level indicative of a delivery capability using the second vehicle based on the first score and the second score;
    determine that the first confidence level is above a first threshold;
    determine, based on at least a portion of the information, a second confidence level indicative of a delivery capability using the third vehicle is below the first threshold; and
    cause, based on the first confidence level and the second confidence level, the first vehicle to dispatch the second vehicle to perform the delivery to a drop-off location at the delivery location instead of the third vehicle.

7. The device of claim 6, further comprising computer-executable instructions that cause the processor to:
    determining that the second confidence level is below a second threshold;
    generating a delivery report, the delivery report including at least one reason that the second confidence level is below the second threshold;
    transmitting the delivery report to a user device; and
    scheduling a delivery of the item to the location.

8. The device of claim 6, wherein determining the first confidence level further comprises at least one of:
    determining at least one of a historical success rate of deliveries to the location or a user complaint rate; or
    determining that a delivery route is blocked.

9. The device of claim 6, wherein the information comprises at least one of: an image of the location, an aerial photograph of the location, a road condition report, a weather report, a wind speed at the location, crime data associated with the location, a historical delivery report associated with at least one previous delivery to the location, a user profile associated with at least one user residing at the location, a delivery time, a presence of the user at the location, a presence of delivery vehicles at the location, an item-size characteristic, an item-weight characteristic, a tree coverage at the location, or a distance between the first vehicle, second vehicle, and/or third vehicle and the location.

10. A non-transitory computer-readable medium storing computer-executable instructions which, when executed by a processor, cause the processor to perform operations comprising:
    determining a location for a delivery of at least one item;
    determining information associated with the delivery;
    cause a first vehicle to navigate the at least one item, a second vehicle, and a third vehicle to a delivery location, wherein the first vehicle is an autonomous vehicle (AV), and the second vehicle is an unmanned aerial vehicle (UAV), and wherein the third vehicle is a ground-based robotic vehicle;
    determining a first score associated with a first obstacle between the first vehicle and a drop-off location, wherein the first score is provided a first weight;
    determining a second score associated with a second obstacle between the first vehicle and the drop-off location, wherein the second score is provided a second weight;
    determining a first confidence level indicative of a delivery capability using the second vehicle based on the first score and the second score;
    determining that the first confidence level is above a first threshold;
    determining, based on at least a portion of the information, a second confidence level indicative of a delivery capability using the third vehicle is below the first threshold; and
    causing, based on the first confidence level and the second confidence level, the first vehicle to dispatch the second vehicle to perform the delivery to a drop-off location at the delivery location instead of the third vehicle.

11. The non-transitory computer-readable medium of claim 10, wherein the information comprises at least one of: an image of the location, an aerial photograph of the location, a road condition report, a weather report, a wind speed at the location, crime data associated with the location, a historical delivery report associated with at least one previous delivery to the location, a user profile associated with at least one user residing at the location, a delivery time, a presence of the user at the location, a presence of delivery vehicles at the location, an item-size characteristic, an item-weight characteristic, a tree coverage at the location, or a distance between the first vehicle, second vehicle, and/or third vehicle and the location.

12. The non-transitory computer-readable medium of claim 10, wherein capturing sensor data by the first vehicle or the second vehicle at the delivery location further comprises causing the second vehicle to deploy from the first vehicle to capture the sensor data from the location of the delivery.

13. The non-transitory computer-readable medium of claim 10, wherein causing the second vehicle to deliver the at least one item from the first vehicle to the drop-off location is further based on a determination that the first vehicle is unable to deliver the at least one item to the drop-off location.

14. The non-transitory computer-readable medium of claim 13, wherein the determination that the first vehicle is unable to deliver the at least one item to the drop-off location includes a determination that an obstacle exists between the first vehicle and the drop-off location.

15. The method of claim 1, wherein determining that the delivery capability using the third vehicle is below the first threshold is based on an obstacle existing between the first vehicle and the drop-off location.

16. The method of claim 1, further comprising:
    causing, by the processor and based on a delivery preference of a user, the first vehicle to retain the second vehicle and third vehicle within the first vehicle and send, by the first vehicle, a request for the user to manually retrieve the at least one item from the first vehicle.

* * * * *